United States Patent
Farrar et al.

(10) Patent No.: US 12,509,287 B2
(45) Date of Patent: Dec. 30, 2025

(54) CONTAINER

(71) Applicant: CRATEIGHT LIMITED, London (GB)

(72) Inventors: Peter Antony Farrar, Yorkshire (GB); John Hein, Yorkshire (GB); Andrew Nikita Cunynghame Stramentov, Greater London (GB); Anthony Henry Joseph Fraser, Leicestershire (GB)

(73) Assignee: CRATEIGHT LIMITED, London (GB)

( * ) Notice: Subject to any disclaimer, the term of this patent is extended or adjusted under 35 U.S.C. 154(b) by 0 days.

(21) Appl. No.: 18/282,445

(22) PCT Filed: Mar. 8, 2022

(86) PCT No.: PCT/GB2022/050598
§ 371 (c)(1),
(2) Date: Sep. 15, 2023

(87) PCT Pub. No.: WO2022/195253
PCT Pub. Date: Sep. 22, 2022

(65) Prior Publication Data
US 2024/0158153 A1    May 16, 2024

(30) Foreign Application Priority Data

Mar. 16, 2021 (GB) .................................... 2103606

(51) Int. Cl.
*B65D 21/08* (2006.01)
*B32B 3/12* (2006.01)
(Continued)

(52) U.S. Cl.
CPC .............. *B65D 81/022* (2013.01); *B32B 3/12* (2013.01); *B32B 27/08* (2013.01); *B32B 27/32* (2013.01);
(Continued)

(58) Field of Classification Search
CPC .......... A47G 1/08; B65D 11/10; B65D 11/26; B65D 45/16; B65D 65/406; B65D 65/44;
(Continued)

(56) References Cited

U.S. PATENT DOCUMENTS

| | | | | |
|---|---|---|---|---|
| 2,895,599 A | * | 7/1959 | Moyer ................ | B65D 21/083 206/499 |
| 2,950,001 A | * | 8/1960 | Bucko .................... | B65D 85/48 217/53 |

(Continued)

FOREIGN PATENT DOCUMENTS

| | | |
|---|---|---|
| CN | 105705311 A | 6/2016 |
| CN | 108438451 A | 8/2018 |

(Continued)

OTHER PUBLICATIONS

Rokbox Website https://rok-box.com/products-pricing/ (Year: 2025).*
(Continued)

*Primary Examiner* — Gideon R Weinerth
(74) *Attorney, Agent, or Firm* — Harness, Dickey & Pierce, P.L.C.

(57) ABSTRACT

A container having three pairs of parallel sides; wherein one pair of sides is formed from side panels that comprise a sheet of honeycomb polypropylene with a sheet formed from polypropylene joined to one side of the honeycomb; and at least one pair of sides is formed from elongate sections formed from expanded polypropylene.

17 Claims, 3 Drawing Sheets

(51) Int. Cl.

| | |
|---|---|
| *B32B 27/08* | (2006.01) |
| *B32B 27/32* | (2006.01) |
| *B65D 6/00* | (2006.01) |
| *B65D 6/34* | (2006.01) |
| *B65D 25/10* | (2006.01) |
| *B65D 45/16* | (2006.01) |
| *B65D 65/40* | (2006.01) |
| *B65D 81/02* | (2006.01) |
| *B65D 81/05* | (2006.01) |
| *B65D 85/30* | (2006.01) |

(52) U.S. Cl.
CPC .............. *B65D 11/10* (2013.01); *B65D 11/26* (2013.01); *B65D 45/16* (2013.01); *B65D 65/406* (2013.01); *B65D 65/44* (2013.01); *B65D 85/30* (2013.01); *B32B 2250/03* (2013.01); *B32B 2250/242* (2013.01); *B32B 2439/62* (2013.01); *B65D 2565/386* (2013.01)

(58) Field of Classification Search
CPC ................ B65D 81/022; B65D 85/30; B65D 2565/386; B32B 3/12; B32B 27/08; B32B 27/32; B32B 2250/03; B32B 2250/242; B32B 2439/62; Y02W 30/80
USPC ................................................. 206/523, 449
See application file for complete search history.

(56) References Cited

U.S. PATENT DOCUMENTS

| | | | | |
|---|---|---|---|---|
| 3,655,034 | A * | 4/1972 | Stollman | B65D 81/07 206/499 |
| 4,664,254 | A * | 5/1987 | Sitwell | B65D 81/24 206/583 |
| 4,892,193 | A * | 1/1990 | Thomas | B44D 7/00 206/453 |
| 4,948,039 | A * | 8/1990 | Amatangelo | B65D 65/406 229/942 |
| 5,259,523 | A * | 11/1993 | Scherb | B65D 11/188 206/583 |
| 5,518,118 | A * | 5/1996 | Putz | B65D 81/05 206/451 |
| 5,803,258 | A * | 9/1998 | Gonzalez-Rivera | B65D 85/30 206/454 |
| 7,422,112 | B1 * | 9/2008 | Harte | B65D 81/09 206/583 |
| 7,686,169 | B1 * | 3/2010 | Harte | B65D 81/03 206/583 |
| 9,573,338 | B2 * | 2/2017 | Bartolome | B32B 5/12 |
| 10,131,370 | B1 * | 11/2018 | Harte | B62B 3/004 |
| 10,723,539 | B2 * | 7/2020 | Van Kralingen | B32B 5/18 |
| 10,816,256 | B2 | 10/2020 | Knight et al. | |
| 11,104,507 | B2 * | 8/2021 | Farrar | B65D 21/083 |
| 11,161,673 | B2 * | 11/2021 | Wines | A47B 47/0075 |
| 11,470,986 | B2 * | 10/2022 | Feig | A47G 1/102 |
| 12,024,338 | B2 * | 7/2024 | Kracht | B65D 25/24 |
| 2004/0111944 | A1 | 6/2004 | Gatt et al. | |
| 2007/0023397 | A1 * | 2/2007 | Hohne | B65D 81/057 217/36 |
| 2009/0178321 | A1 * | 7/2009 | Kucharski | A47G 1/08 40/700 |
| 2012/0021168 | A1 * | 1/2012 | Tanii | B31D 3/0292 428/116 |
| 2012/0237717 | A1 * | 9/2012 | Dunn | B32B 29/007 428/116 |
| 2014/0053443 | A1 * | 2/2014 | Prayias | B44D 7/00 40/725 |
| 2015/0034636 | A1 * | 2/2015 | Aaland | B65D 25/10 220/660 |
| 2015/0239200 | A1 * | 8/2015 | Bartolome | B32B 27/42 428/118 |
| 2015/0321443 | A1 | 11/2015 | Comtois et al. | |
| 2017/0037928 | A1 * | 2/2017 | Kronkright | F16F 13/005 |
| 2018/0305083 | A1 * | 10/2018 | Van Der Kevie | B65D 5/509 |
| 2019/0322445 | A1 * | 10/2019 | Farrar | B65D 21/0201 |
| 2019/0367242 | A1 * | 12/2019 | Kronkright | F16F 15/08 |
| 2020/0002076 | A1 * | 1/2020 | Wines | A47B 47/0075 |
| 2021/0267334 | A1 * | 9/2021 | Botdorf | B65D 81/07 |
| 2022/0204065 | A1 * | 6/2022 | Young | B65D 90/18 |
| 2023/0294880 | A1 * | 9/2023 | Cooke | B65D 25/108 206/454 |
| 2024/0158153 | A1 * | 5/2024 | Farrar | B32B 27/32 |
| 2024/0336028 | A1 * | 10/2024 | Otobe | B32B 5/265 |

FOREIGN PATENT DOCUMENTS

| | | |
|---|---|---|
| CN | 212501985 U | 2/2021 |
| EP | 0524658 A1 | 1/1993 |
| EP | 3554954 A1 | 10/2019 |
| FR | 3052753 A1 | 12/2017 |
| WO | 2020/005314 A1 | 1/2020 |

OTHER PUBLICATIONS

Rokbox Website https://rok-box.com (Year: 2025).*
Chinese Office Action regarding Application No. 202280027740.7, dated Sep. 6, 2025.

* cited by examiner

CONTAINER

CROSS REFERENCE TO RELATED APPLICATIONS

This application is a U.S. National Phase Application under 35 U.S.C. 371 of International Application No. PCT/GB2022/050598, filed on Mar. 8, 2022, which claims priority to United Kingdom Application No. 2103606.6, filed on Mar. 16, 2021. The entire disclosures of both applications are expressly incorporated by reference herein.

The present invention relates to containers. The present invention may in particular be useful for provision of a container for holding artwork during transportation and storage. However, it will be appreciated that the container of the present invention may be used for many other purposes.

Containers that are intended to be repeatedly re-used need to be durable. They are typically also formed from plural components, such as sides, connectors to hold the sides together, and other fixings. Each of these plural components is formed from a material that is selected to perform well the function of the component and they may each be permanently secured to each other to form a robust container. As a consequence, when the container reaches the end of its working life, the plurality of components each formed from a different material makes it difficult to recycle the materials used to form the container, even if the materials used to form each component are intrinsically relatively easy to recycle. For example, the container must be broken down into its constituent parts and each material must be recognised and treated separately, including separating out different kinds of plastic.

It is therefore desirable to provide a high quality container that can be more readily processed at the end of its working life.

According to the present invention there is provided a container as specified in the claims.

The invention will now be further described by way of example, with reference to the accompanying drawings, in which.

Figure 1:
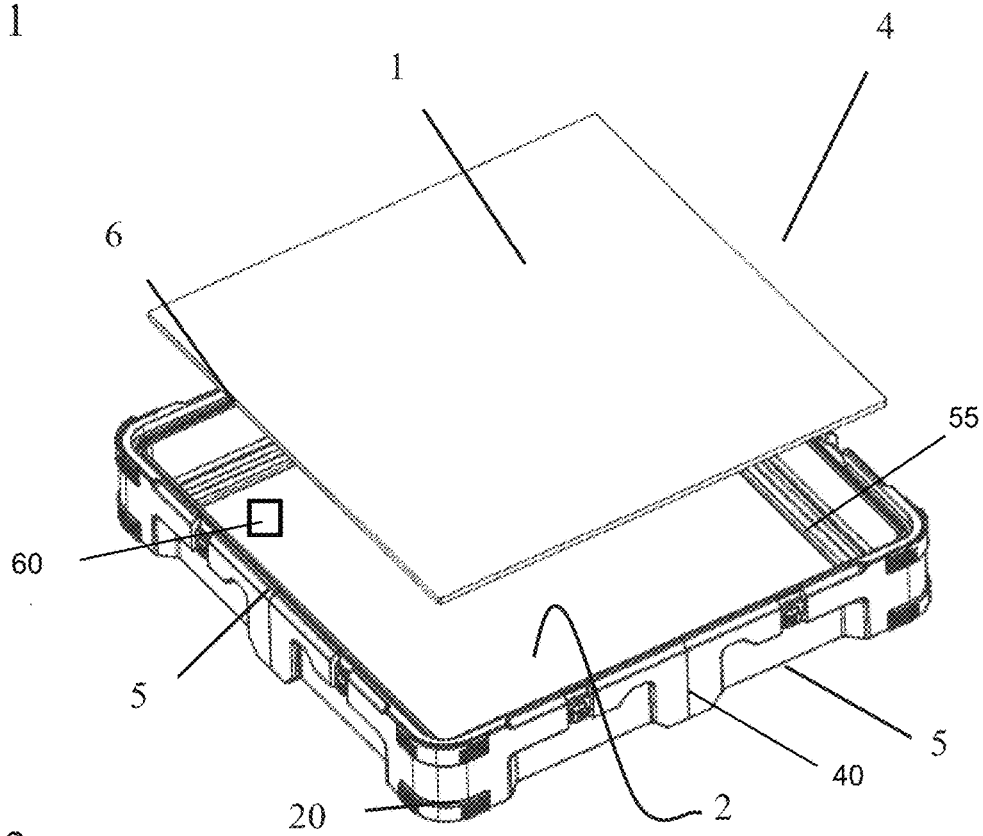
FIG. 1 depicts a container with one side detached.

FIG. 1 shows an example of a container. As shown, the container may have three pairs of parallel sides 1, 2, 3, 4, 5, 6. Each of the sides may be arranged to be orthogonal to the sides of the other two pairs, such that the container defines a generally cuboid shape.

In an arrangement, as shown in FIG. 1, the container may have dimensions that make it convenient for the storage and/or transportation of artwork. In such an arrangement, depth of the container may be much smaller than the size of its major faces, corresponding to a first pair of sides 1, 2. For example, the shortest edge of the first pair of sides 1, 2 may be at least twice the length of the shortest edge of the other sides 3, 4, 5, 6, optionally at least three times as large, optionally at least four times as large, optionally at least five times as large. It will be appreciated that the dimensions and/or relative dimensions may be selected such that the interior volume of the container is suitable for receiving the object to be carried within the container, for example, an artwork.

In order to provide a container that can be readily processed at the end of its working life, the container of the present disclosure is predominantly formed from a single material, polypropylene, but uses different forms of polypropylene for different components to provide the desired performance characteristics for each component. Subject to removing a few components that may be formed from other materials, the substantially the entire container may therefore be easily recycled without significant dismantling because it is all formed from the same basic material. For example, a container according to the present disclosure may be at least 80% polypropylene, optionally at least 90% polypropylene, optionally at least 95% polypropylene by mass.

Figure 2:
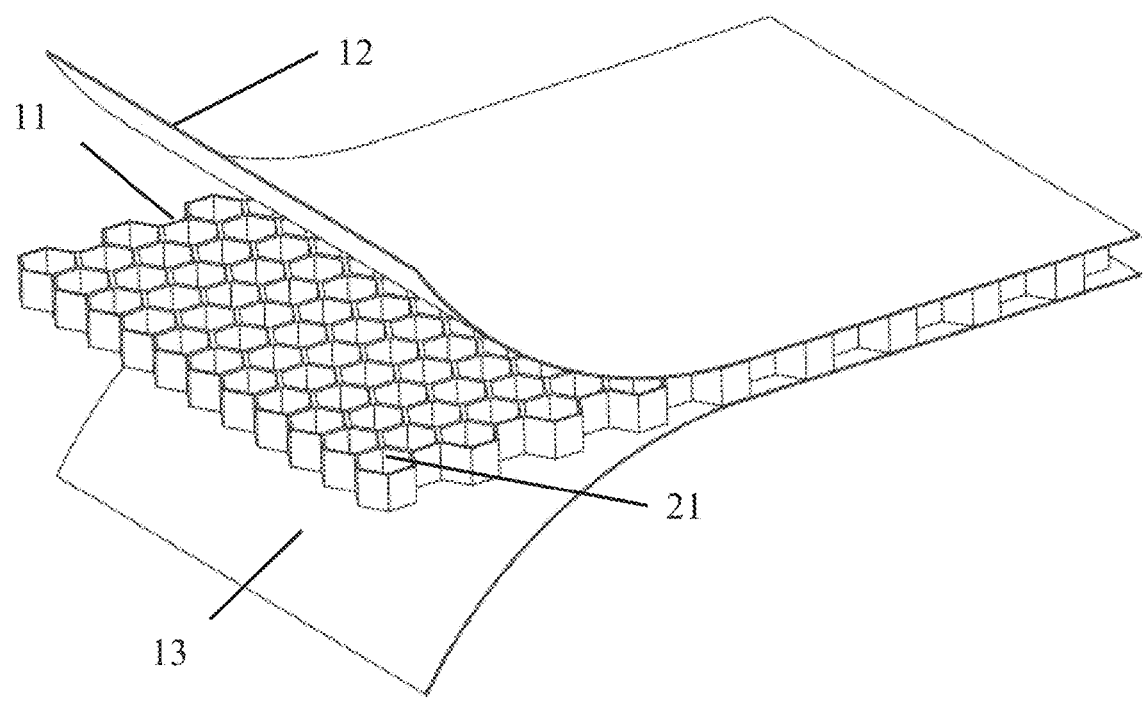
FIG. 2 depicts and exploded view of a component of the container.

The first pair of sides 1, 2 may be formed from side panels 1, 2 that may have a relatively high aspect ratio as discussed above, namely relatively long and wide compared to the thickness of the side panel. FIG. 2 schematically depicts an exploded view of one of the side panels 1, 2. As shown, the side panel 1, 2 is formed from a sheet of honeycomb polypropylene 11 with a sheet of polypropylene 12 joined to at least one side of the honeycomb polypropylene 11. As shown in FIG. 2, each of the side panels may have a sheet of polypropylene 12, 13 joined on either side of the sheet of honeycomb polypropylene 11, which may form a core of the panel.

As shown in FIG. 2, the honeycomb polypropylene 11 may be formed from a plurality of hollow hexagonal cells 21 oriented such that the hexagonal sections extend through the thickness of the honeycomb polypropylene sheet 11. The sheet of honeycomb polypropylene may, for example, be formed by an extrusion process.

The sheet of polypropylene 12, 13 may be a sheet of woven fabric polypropylene sheet, formed by weaving strands of polypropylene fibres to form a sheet of fabric. Alternatively the sheet of polypropylene 12, 13 may for formed from cast polypropylene. In an arrangement, one or both of the side panels may have a sheet of woven fabric polypropylene on one side of the honeycomb polypropylene sheet and a cast sheet of polypropylene on the other side.

Joining the polypropylene sheet 12, 13 to the honeycomb polypropylene 11 produces a panel of material that has excellent strength to weight ratio, excellent puncture resistance and is significantly more rigid that the honeycomb polypropylene layer alone. Additionally, use of woven fabric polypropylene may further enhance the strength to weight ratio of the panel and its puncture resistance. It may also enhance the ability of fixings, such as screws, to be secured to the panel.

In an arrangement, the polypropylene sheet 12, 13 may be joined to the honeycomb polypropylene by thermo-lamination, in which one or both of the components is heated and then the components are pressed together. In an alternative arrangement, an adhesive may be used to join the polypropylene sheet 12, 13 to the honeycomb polypropylene sheet 11. However, such an arrangement may be considered to be less desirable because it introduces an additional material.

One or both of the other two pairs of sides 3, 4, 5, 6 of the container may be formed from elongate sections of expanded polypropylene. Expanded polypropylene is polypropylene that has been foamed and formed into its final shape. The expanded polypropylene may be at least 90% gas by volume, optionally at least 95% gas by volume, optionally at least 98% gas by volume. Depending on the production method, the gas may be air. The resultant material has good strength to weight ratio and is both tough and able to absorb energy from an impact.

Two or more, optionally all of, the sides 3, 4, 5, 6 formed from elongate sections of expanded polypropylene may be formed as a single component, for example, produced in a single mould. Alternatively, each of the sides 3, 4, 5, 6 may be formed as a separate component, in which case two sides formed from expanded polypropylene may be joined together at a corner, for example using a mitre joint, dovetail joint, or other suitable joint. Depending on the joint used, an adhesive may also be used to complete the join.

In a further arrangement, sections of expanded polypropylene may be joined at a join 40 part-way along a side 3, 4, 5, 6 of the container. For example, a container may be formed from four corner sections of expanded polypropylene, each forming a corner between two sides 3, 4, 5, 6 of the container and part, for example half, of the two sides. In a variant of such an arrangement one or more sections of expanded polypropylene may be provided between, and joined to, two corner sections of expanded polypropylene to form a side of the container.

In an arrangement, where two sections formed from expanded polypropylene are joined together, a joint reinforcement may be used to strengthen the joint. The joint reinforcement may be provided within the sections of expanded polypropylene, for example in the form of one or more rods that extend from within one section of expanded polypropylene to within an adjoining section or expanded polypropylene. Alternatively or additionally, the joint reinforcement may be provided external to the sections of expanded polypropylene, for example as a reinforcing plate provided across the joint. In any case, the joint reinforcement may be connected to the sections of expanded polypropylene using an adhesive and/or using fixings such as screws or barbed plugs that are inserted into the expanded polypropylene.

The joint reinforcement may be formed from injection moulded polypropylene, such that it does not have to be removed from the container before it is recycled. Alternatively or additionally, any fixings used to secure the joint reinforcement to the expanded polypropylene may also be formed from injection moulded polypropylene. Although made from the same material, injection moulded polypropylene may be stronger and tougher than the expanded polypropylene, making it suitable for forming the joint reinforcement and/or fixings.

As shown in FIG. 1, an impact protector 20 may be provided on the outer surface of at least one of the sides 3, 4, 5, 6 formed from expanded polypropylene. Such an impact protector 20 may be beneficial because, although the expanded polypropylene is good at absorbing impact energy, it is relatively soft and therefore may not offer good puncture resistance and/or may become scuffed in use. As with the joint reinforcement, the impact protector 20 may be connected to the expanded polypropylene using an adhesive and/or by fixings such as screws or barbed plugs. Again, as with the joint reinforcement, the impact protector 20 may also be formed from injection moulded polypropylene. The injection moulded polypropylene may provide better abrasion resistance than the expanded polypropylene, making it suitable for use as an impact protector. Similarly, any fixings used to secure the impact protector to the impact polypropylene may alternatively or additionally be formed from injection moulded polypropylene.

As shown in FIG. 1, an impact protector 20 may be provided at a corner where two sections of expanded polypropylene are joined. In an arrangement where two sections of expanded polypropylene are joined at the corner, a single component may function as both a joint reinforcement and an impact protector 20.

Alternatively or additionally, a container may include an impact protector provided part-way along a side formed from expanded polypropylene. Such an impact protector may be coincident with the location of a join between two sections of expanded polypropylene, in which case a single component part-way along the side of the container may function as both a joint reinforcement and an impact protector.

Where an impact protector is provided, the impact protector may protrude from a surface of the side 3, 4, 5, 6 formed from expanded polypropylene on which it is provided. Such an arrangement may beneficially protect the side formed from expanded polypropylene, for example when the container is placed on the ground, because the protrusion of the impact protector from the surface of the expanded polypropylene ensures that the surface of the expanded polypropylene is kept separate from the ground, preventing the ground from scuffing the expanded polypropylene surface.

Figure 5:
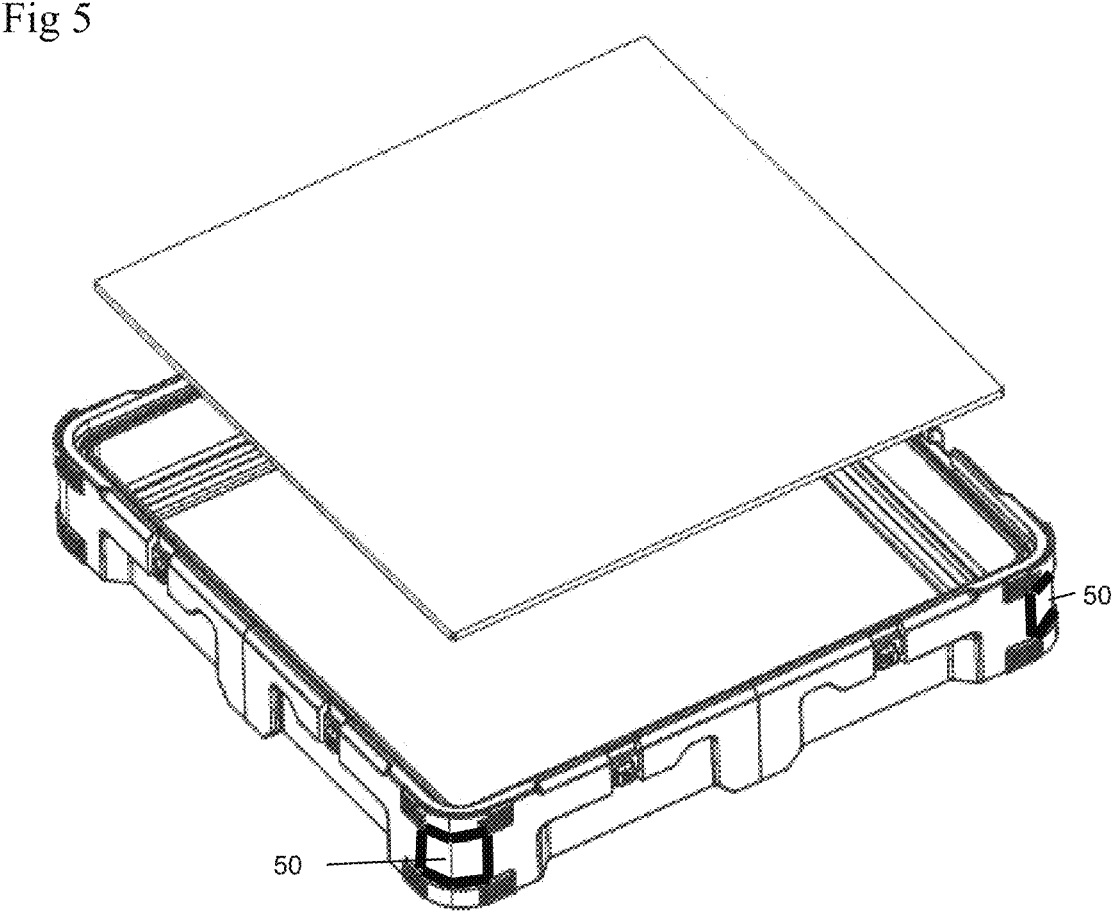
FIG. 5 depicts a variant of FIG. 1.

In an arrangement, two sections, such as two sides 3, 4, 5, 6 formed from expanded polypropylene may be indirectly connected to each other, for example at a corner, by way of a connector 50, as shown in FIG. 5. Such a connector may be formed from injection moulded polypropylene and, as with the joint reinforcement and impact protectors discussed above, may be connected to the injection moulded polypropylene by adhesives and/or by fixings such as screws or barbed plugs that themselves may alternatively or additionally be formed from injection moulded polypropylene. Where a connector is used to join two sections of expanded polypropylene, the connector may be configured such that it protrudes from a surface of the expanded polypropylene that forms a side 3, 4, 5, 6 of the container such that when the container is placed with that side on the floor, the surface of the expanded polypropylene is separated from the floor.

In an arrangement, one of the side panels 1 may be detachably attached to the container, for example in order to provide access to the interior of the container in order to place an object into, or remove the object from, the container. The detachably attached side panel 1 may be secured to the container using one or more fittings formed from injection moulded polypropylene, which may provide better resistance to tearing than, for example, the expanded polypropylene.

Figure 3:
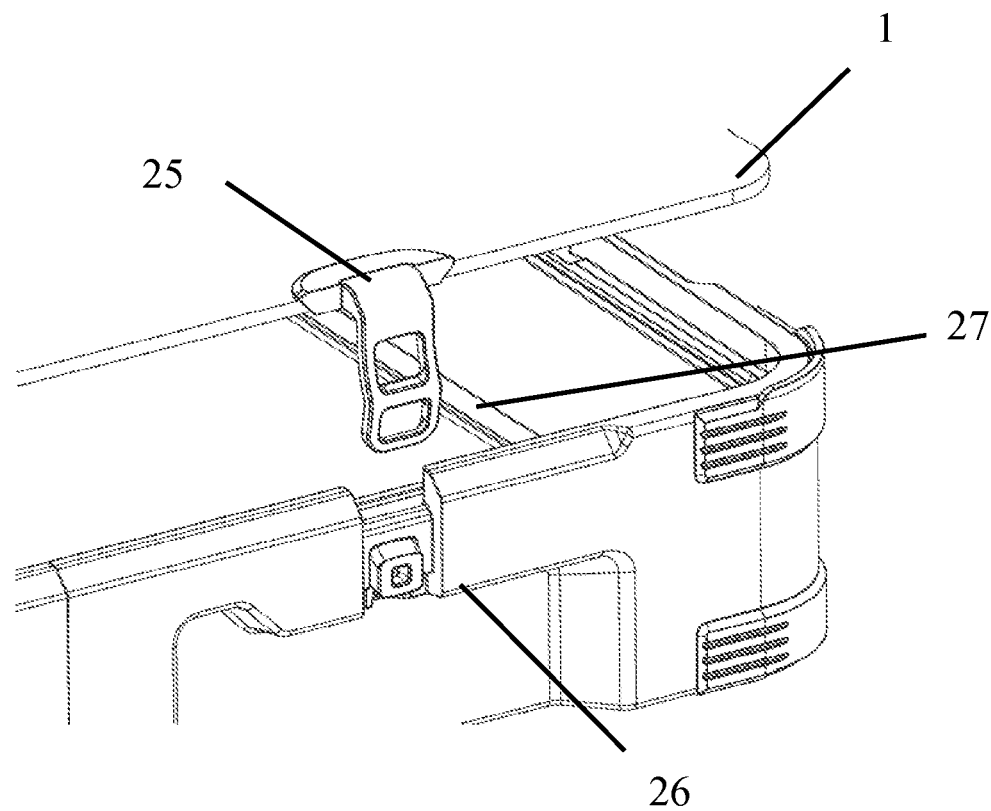
FIG. 3 depicts a detail of an optional arrangement for securing a detachable side panel.

In an arrangement, as depicted in FIG. 3, the fittings to secure a detachably attached panel 1 to the container may include at least one hook or attachment point 25 provided on the detachably attached side panel 1 and at least one hook 26 or attachment point provided on one of the sides 3, 4, 5, 6 formed from expanded polypropylene. One or both hooks or attachment points may be formed from injection moulded polypropylene. An elastic loop 27 may be provided that can extend between the two hooks or attachment points 25, 26, drawing one to the other in order to secure the detachably attached side panel 1 to the remainder of the container.

Figure 4:
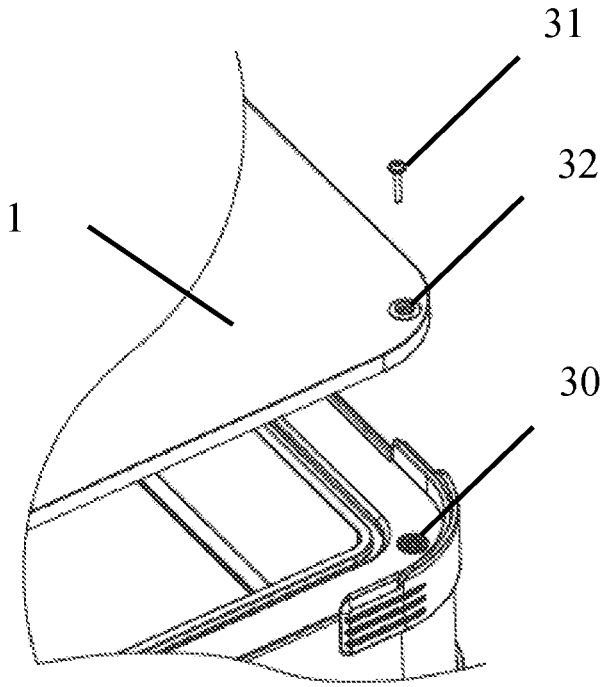
FIG. 4 depicts a detail of an alternative arrangement for securing a detachable side panel.

Alternatively or additionally, as depicted in FIG. 4, the fittings to secure a detachably attached panel 1 to the container may include one or more bosses 30 embedded within the sides 3, 4, 5, 6 formed from expanded polypropylene and configured to receive and secure a connector 31 that passes through the side panel 1. The connector 31 may be, for example, a screw or a bayonet-type connector that can be inserted into the boss 30 and then rotated to a position that prevents removal. The boss 30 may be formed from injection moulded polypropylene. It may be co-moulded within the expanded polypropylene side to secure it therein. Alternatively the boss 30 may be secured within the expanded polypropylene side after formation of the polypropylene side, for example by adhesive or a press-fit connection, in which case the boss 30 may have barbs that engage with the expanded polypropylene. The connector 31 may be formed from injection moulded polypropylene or may be metal. A reinforcement 32, which may be formed from injection moulded polypropylene, may be provided to the detachably attached panel 1 where the connector 31 passes through it.

In an arrangement, one of the side panels 2 may be secured to the sides 3, 4, 5, 6 of the container formed from expanded polypropylene, for example such that it is not detachable. Use of such a secure connection may improve the rigidity of the container. In an arrangement, the sides 3, 4, 5, 6 formed from expanded polypropylene may include a groove 55 along their length that is configured to receive an edge of the side panel 2 within the groove. The edge of the side panel 2 may then be secured to the groove, for example using an adhesive.

Within the container, one or more fittings 60 may be provided in order to secure an object to be held within the container, for example such that the object cannot move within the container. In an arrangement, such fittings may be configured to enable an artwork to be secured within the container. Where fittings are provided to secure an object within the container, the fittings, or a part thereof, may be formed from injection moulded polypropylene.

In an arrangement, an interior surface of the container may be provided with a layer of material suitable for forming one part of a hook and loop fastening. For example, the layer of material may be formed with a plurality of loops. For example, the interior surface of one of the side panels 2 may be substantially covered with the layer of material. The provision of such a layer of material covered with a plurality of loops may not only provide a suitable surface for securing objects within the container using hook and loop fastenings but may also provide a relatively soft surface, reducing the risk of damage to an object being placed within the container.

In an arrangement, the layer of material suitable for forming one part of a hook and loop fastening may itself be formed from polypropylene. Alternatively, the layer of material may be formed from a different material, such as Nylon, that is suitable for forming a hook and loop fastening.

The layer of material suitable for forming one part of a hook and look fastening may be secured to the side panel 2 by an adhesive. It has been found that where a layer of material comprising Nylon loops has been adhered to the surface of a side panel that is formed from a sheet of woven fabric polypropylene by means of a suitably selected adhesive, the layer of Nylon material may be subsequently forcibly removed from the side panel 2, leaving the sheet of woven fabric polypropylene substantially intact. Accordingly, even in arrangements in which it is necessary to use a different material from polypropylene in order to form the layer of material suitable for forming a hook and loop fastening, that one component can still be readily removed from the remainder of the container, leaving a container that is substantially formed from polypropylene only and which can therefore be readily recycled.

The invention claimed is:

1. A container having three pairs of parallel sides, the container comprising;
    one pair of sides formed from side panels that comprise a sheet of honeycomb polypropylene with two sheets of polypropylene joined on either side of the honeycomb polypropylene; and
    two pairs of sides formed from elongate sections formed from expanded polypropylene,
    wherein the elongate sections formed from expanded polypropylene are joined to each other, and the joins between the sections of expanded polypropylene are located part-way along one of the sides of the container.

2. A container according to claim 1, wherein the polypropylene sheet is joined to the honeycomb polypropylene by at least one of thermo-lamination and an adhesive.

3. A container according to claim 1, wherein the polypropylene sheet joined to the honeycomb polypropylene is cast polypropylene.

4. A container according to claim 1, further comprising a layer of material including one part of a hook and loop fastening which substantially covers an interior surface of one of the side panels.

5. A container according to claim 4, wherein the layer of material includes one part of a hook and loop fastening and is formed from polypropylene.

6. A container according to claim 1, further comprising at least one component formed from injection moulded polypropylene.

7. A container according to claim 1, wherein two elongate sections formed from expanded polypropylene are joined to each other; and
    the container further comprises a joint reinforcement, configured to strengthen a joint between the two elongate sections formed from expanded polypropylene, wherein the joint reinforcement is formed from injection moulded polypropylene.

8. A container according to claim 7, wherein said two elongate sections of expanded polypropylene are joined by a connector formed from injection moulded polypropylene.

9. A container according to claim 1, further comprising an impact protector provided on the outer surface of at least one of the sides formed from the elongate sections of expanded polypropylene,
    wherein the impact protector is formed from injection moulded polypropylene and the impact protector protrudes from the surface of the at least one side of the elongate sections of expanded polypropylene.

10. A container according to claim 1, wherein one of the side panels is detachably attached to the container and the detachably attached side panel is secured to the container using one or more fittings formed from injection moulded polypropylene.

11. A container according to claim 1, wherein one of the side panels is secured to the sides formed from elongate sections of expanded polypropylene.

12. A container according to claim 11, wherein the sides formed from elongate sections of expanded polypropylene comprise a groove configured to receive an edge of the side panel within the groove, and the edge of the side panel is secured to the groove.

13. A container according to claim 11, wherein the side panel is secured to the sides formed from elongate sections of expanded polypropylene using an adhesive.

14. A container according to claim 1, wherein the length of the shortest edge of the sides formed from side panels is at least two times the length of the shortest edge of the other sides.

15. A container according to claim 1, wherein the expanded polypropylene used to form the elongate sections forming sides of the container is at least 90% gas by volume.

16. A container according to claim 1, wherein mass of the container is at least 90% polypropylene.

17. A container according to claim 1, further comprising at least one fitting configured to secure an artwork within the container,
    wherein the at least one of the fittings configured to secure the artwork is formed from injection moulded polypropylene.

\* \* \* \* \*